US012693206B2

(12) United States Patent
Minemura et al.

(10) Patent No.: US 12,693,206 B2
(45) Date of Patent: Jul. 28, 2026

(54) PARTICLE MEASURING APPARATUS

(71) Applicant: Hitachi High-Tech Corporation, Tokyo (JP)

(72) Inventors: Hiroyuki Minemura, Tokyo (JP); Yumiko Anzai, Tokyo (JP); Kentaro Osawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 18 days.

(21) Appl. No.: 18/697,047

(22) PCT Filed: Jan. 21, 2022

(86) PCT No.: PCT/JP2022/002107
§ 371 (c)(1),
(2) Date: Mar. 29, 2024

(87) PCT Pub. No.: WO2023/139741
PCT Pub. Date: Jul. 27, 2023

(65) Prior Publication Data
US 2024/0410811 A1 Dec. 12, 2024

(51) Int. Cl.
*G01N 15/1434* (2024.01)
*G01N 15/04* (2006.01)
*G01N 15/14* (2024.01)

(52) U.S. Cl.
CPC ......... *G01N 15/1434* (2013.01); *G01N 15/04* (2013.01); *G01N 2015/1493* (2013.01)

(58) Field of Classification Search
CPC ............... G01N 15/1434; G01N 15/04; G01N 2015/0092; G01N 15/0227;
(Continued)

(56) References Cited

U.S. PATENT DOCUMENTS 8,209,128 B1 * 6/2012 Gourley ................. G01N 21/47
356/417
2005/0161592 A1 * 7/2005 Watanabe ............ G02B 21/006
250/234
(Continued)

FOREIGN PATENT DOCUMENTS

CN 104390895 A 3/2015
EP 3 910 315 A1 11/2021
(Continued)

OTHER PUBLICATIONS

Japanese-language Office Action issued in Japanese Application No. 2023-574990 dated May 20, 2025 with English translation (6 pages).
(Continued)

*Primary Examiner* — Sang H Nguyen
(74) *Attorney, Agent, or Firm* — Crowell & Moring LLP

(57) ABSTRACT

An object of the invention is to provide a particle measuring device capable of determining a type of a particle. The particle measuring device according to the invention repeatedly scans a focal position of light along an optical axis direction in a three-dimensional region in a sample, calculates two or more of (a) one or more parameters that are obtained based on a maximum intensity of reflected light from particles, the maximum intensity being acquired from each focal position in a scanning process, and that indicate a type of the particles and (b) one or more parameters that are obtained based on positions of the particles acquired by continuously tracking the particles and that indicate a type of the particles, and outputs a calculation result.

14 Claims, 11 Drawing Sheets

(58) Field of Classification Search
CPC ... G01N 2015/1493; G01N 2015/1452; G01B
2290/45; G01B 9/02041; G01B 9/02091
See application file for complete search history.

(56) References Cited

U.S. PATENT DOCUMENTS

| | | | |
|---|---|---|---|
| 2006/0038996 A1* | 2/2006 | Kuroiwa | G01N 21/6458 |
| | | | 356/328 |
| 2008/0117421 A1* | 5/2008 | Yamaguchi | G01J 3/021 |
| | | | 356/417 |
| 2010/0284024 A1* | 11/2010 | Vucinic | G02B 27/126 |
| | | | 250/559.19 |
| 2013/0100462 A1* | 4/2013 | Hollenbeck | G01N 21/253 |
| | | | 356/614 |
| 2013/0228705 A1* | 9/2013 | Nishikawa | G01N 15/1433 |
| | | | 250/459.1 |
| 2013/0314717 A1* | 11/2013 | Yi | G01N 21/64 |
| | | | 356/479 |
| 2014/0162268 A1* | 6/2014 | Tanabe | G01N 15/1429 |
| | | | 435/287.2 |
| 2017/0160185 A1 | 6/2017 | Minemura et al. | |
| 2018/0031464 A1* | 2/2018 | Norisuye | G01N 15/0211 |
| 2018/0120214 A1 | 5/2018 | Kato et al. | |
| 2019/0072375 A1 | 3/2019 | Osawa | |
| 2020/0033247 A1* | 1/2020 | Yamaguchi | G01N 15/14 |

FOREIGN PATENT DOCUMENTS

| | | | |
|---|---|---|---|
| JP | 4339924 B1 | 10/2009 | |
| JP | 2019-45431 A | 3/2019 | |
| JP | 6559555 B2 | 8/2019 | |
| JP | 2020-109419 A | 7/2020 | |
| WO | WO 2016/159131 A1 | 10/2016 | |
| WO | WO 2021/199797 A1 | 10/2021 | |

OTHER PUBLICATIONS

International Search Report (PCT/ISA/210) issued in PCT Application No. PCT/JP2022/002107 dated Mar. 8, 2022 with English translation (6 pages).
Japanese-language Written Opinion (PCT/ISA/237) issued in PCT Application No. PCT/JP2022/002107 dated Mar. 8, 2022 with English translation (6 pages).
Burg, T et al.; "Suspended microchannel resonators for biomolecular detection", Applied Physics Letters 83, Sep. 29, 2003, pp. 2698-2700, vol. 83, No. 13 (4 pages).
Extended European Search Report issued in European Application No. 22921898.7 dated Sep. 25, 2025 (12 pages).

* cited by examiner

PARTICLE DIAMETER (μm)

SIGNAL AT FOCAL POINT

PARTICLE

REFLECTED LIGHT

FOCAL PLANE

Lens

N

Z POSITION $L_z$ t

TIME $$\Delta t > \frac{p_z}{L_z} t_c$$

m-th (m+1)-th $$\Delta t < \frac{p_z}{L_z} t_c$$

m-th (m+1)-th

US 12,693,206 B2

<div style="display:flex">

<div>

1

PARTICLE MEASURING APPARATUS

TECHNICAL FIELD

The present invention relates to a particle measuring device.

BACKGROUND ART

A biopharmaceutical product has an excellent effect that a low-molecular pharmaceutical product does not have, in that an antibody molecule modified with a sugar chain expresses an effect on a specific target such as cancer and a rare disease. While a low-molecular pharmaceutical product is synthesized by a chemical reaction, a biopharmaceutical product is produced by utilizing a biological function of a cell. Since immunoglobulin G (IgG) which is a typical biopharmaceutical product is a large molecule having a complicated structure and a molecular weight of about 150,000, it is almost impossible to prevent non-uniformity of structure. Accordingly, a test technique for confirming safety and effectiveness of a preparation in a biopharmaceutical product plays a more important role. There are various test items for a biopharmaceutical product, and aggregates are an important test item. Since a biopharmaceutical product is a polymer, aggregation is likely to occur, and it is known that the biopharmaceutical product is toxic when aggregation occurs. Therefore, it is required to measure and appropriately manage a size and the number of aggregates contained in a preparation.

In addition to aggregates, a sample of a biopharmaceutical product to be tested may include various types of particles such as droplets of silicon oil, air bubbles, stainless steel, glass, and rubber fragments (in the present specification, these particulate substances are collectively referred to as particles simply). Since an influence on safety and effectiveness of a pharmaceutical product varies depending on a type of particles, and a measure for preventing generation of particles varies depending on a type of the particles, it is important not only to measure a size of the particles but also to determine a type of the particles during testing.

PTL 1 discloses a method of calculating a hydrodynamic size of particles based on a diffusion constant of the particles obtained by observing a Brownian motion of the particles for a certain time, which is called nano particle tracking analysis (NTA), as a particle measuring technique in the related art.

PTL 2 discloses a method of measuring a particle size based on a sedimentation velocity of particles caused by gravity.

PTL 3 discloses a method of measuring a particle size based on an amount of reflected light from particles.

NPL 1 discloses a resonant mass measurement (RMM) method of calculating a mass of particles based on a change in a resonance frequency of a cantilever caused when the particles flow through a flow path provided in the cantilever.

CITATION LIST

Patent Literature

PTL 1: JP2020-109419A
PTL 2: Japanese Patent No. 4339924
PTL 3: Japanese Patent No. 6559555

</div>

<div>

2

Non Patent Literature

NPL 1: T. P. Burg and S. R. Manalis, Appl. Phys. Lett., 2003, 83, 2698-2700.

SUMMARY OF INVENTION

Technical Problem

Regarding a diffusion constant of particles evaluated by the NTA (PTL 1), since a parameter of the related particles is only a size, information other than the size cannot be obtained. In a sedimentation method (PTL 2), since only particles having a density higher than that of a solvent are detected and obtained information is only a sedimentation velocity of the particles, it is difficult to distinguish the particles. In the RMM (NPL 1), a sign of a resonance frequency change varies depending on a magnitude of a density of particles relative to a solvent, it is possible to narrow down types of the particles to a certain extent based on the sign. However, different types of particles having the same magnitude relationship with the solvent cannot be distinguished from one another. As described above, a particle measuring device in the related art detects only one piece of information related to particles such as a diffusion constant or a mass, and thus there is a problem that it is difficult to determine a type of the particles.

The invention has been made in view of the above problem, and an object of the invention is to provide a particle measuring device capable of determining a type of particles.

Solution to Problem

A particle measuring device according to the invention repeatedly scans a focal position of light along an optical axis direction in a three-dimensional region in a sample, calculates two or more of (a) one or more parameters that are obtained based on a maximum intensity of reflected light from particles, the maximum intensity being acquired from each focal position in a scanning process, and that indicate a type of the particles and (b) one or more parameters that are obtained based on positions of the particles acquired by continuously tracking the particles and that indicate a type of the particles, and outputs a calculation result. Accordingly, the type of the particles can be accurately determined based on a plurality of determination parameters.

For example, a particle size is calculated according to a relationship among a maximum light intensity, a refractive index of the particles, a refractive index of a sample solvent, and a particle size. Accordingly, a type of the particles can be determined based on the particle size.

For example, a sphericity of a maximum light intensity of particles is calculated from a maximum light intensity of a plurality of particles corresponding to respective three-dimensional images. Accordingly, particles can be distinguished based on the maximum light intensity and the sphericity.

For example, a time required for scanning a three-dimensional region once is set to a predetermined value or less according to a concentration of particles to be measured and a diffusion constant of a minimum particle. Accordingly, a plurality of pieces of information related to the particles can be acquired with high accuracy, and the particles can be distinguished with high reproducibility.

</div>

</div>

For example, by repeating a step of scanning a focal position of light on a two-dimensional plane perpendicular to an optical axis and a step of moving a position of a focal point in an optical axis direction relative to a sample at a predetermined interval, a time required to repeatedly scan a focal position of light in a specific three-dimensional region of the sample and required to scan the two-dimensional plane once is set to a predetermined value or less according to a width of the three-dimensional region in the optical axis direction, a concentration of a maximum particle to be measured, a diffusion constant of a minimum particle to be measured, and a movement interval of the focal point in the optical axis direction. Accordingly, a plurality of pieces of information related to particles can be acquired with high accuracy, and the particles can be distinguished with high reproducibility.

For example, widths in vertical and horizontal directions of a plane perpendicular to the optical axis in the three-dimensional region and a width in an optical axis direction of the three-dimensional region are set to predetermined values or more according to a time required for scanning the three-dimensional region once, the number of repeated scanning of the three-dimensional region, a diffusion constant of a minimum particle to be measured, a density of particles, a density of a solvent, a viscosity of the solvent, a gravitational acceleration, and a particle diameter. Accordingly, reflected light from a finite number of particles can be repeatedly detected with a high probability, and the particles can be distinguished with high reproducibility.

For example, a diffusion constant of particles is calculated based on a change in time of positions of the particles, or a particle size is calculated based on the diffusion constant. Accordingly, particles can be distinguished based on the maximum light intensity and the diffusion constant.

For example, a sedimentation velocity of particles is calculated based on a change in time of positions of the particles in a gravity direction. Accordingly, the particles can be distinguished based on the maximum light intensity and the sedimentation velocity.

For example, an interference optical system is provided in which light from a light source is split to generate signal light and reference light, and the signal light reflected from a sample is combined with the reference light to generate three or more beams of interference light having different phase relationships from one another. With such a configuration, reflected light from weak particles can be detected with high sensitivity. Small particles can be measured.

For example, two or more pieces of information among four pieces of information are output, the four pieces of information including (a) a maximum light intensity among intensities of reflected light from particles at each focal position of light along the optical axis direction, (b) a diffusion constant of the particles calculated based on a change in time of positions of the particles or a particle size calculated based on the diffusion constant, (c) a sedimentation velocity of the particles calculated based on a change in time of positions of the particles in a gravity direction, and (d) a sphericity of the particles calculated based on a maximum light intensity of a plurality of particles respectively corresponding to a plurality of three-dimensional images. Accordingly, a type of the particles can be determined with higher accuracy.

Advantageous Effects of Invention

According to the invention, it is possible to provide a particle measuring device capable of measuring a particle size and determining a particle type. Problems, configurations, and effects other than those described above will become apparent in the following description of embodiments.

DESCRIPTION OF EMBODIMENTS

Embodiment 1: Device Configuration

Figure 1:
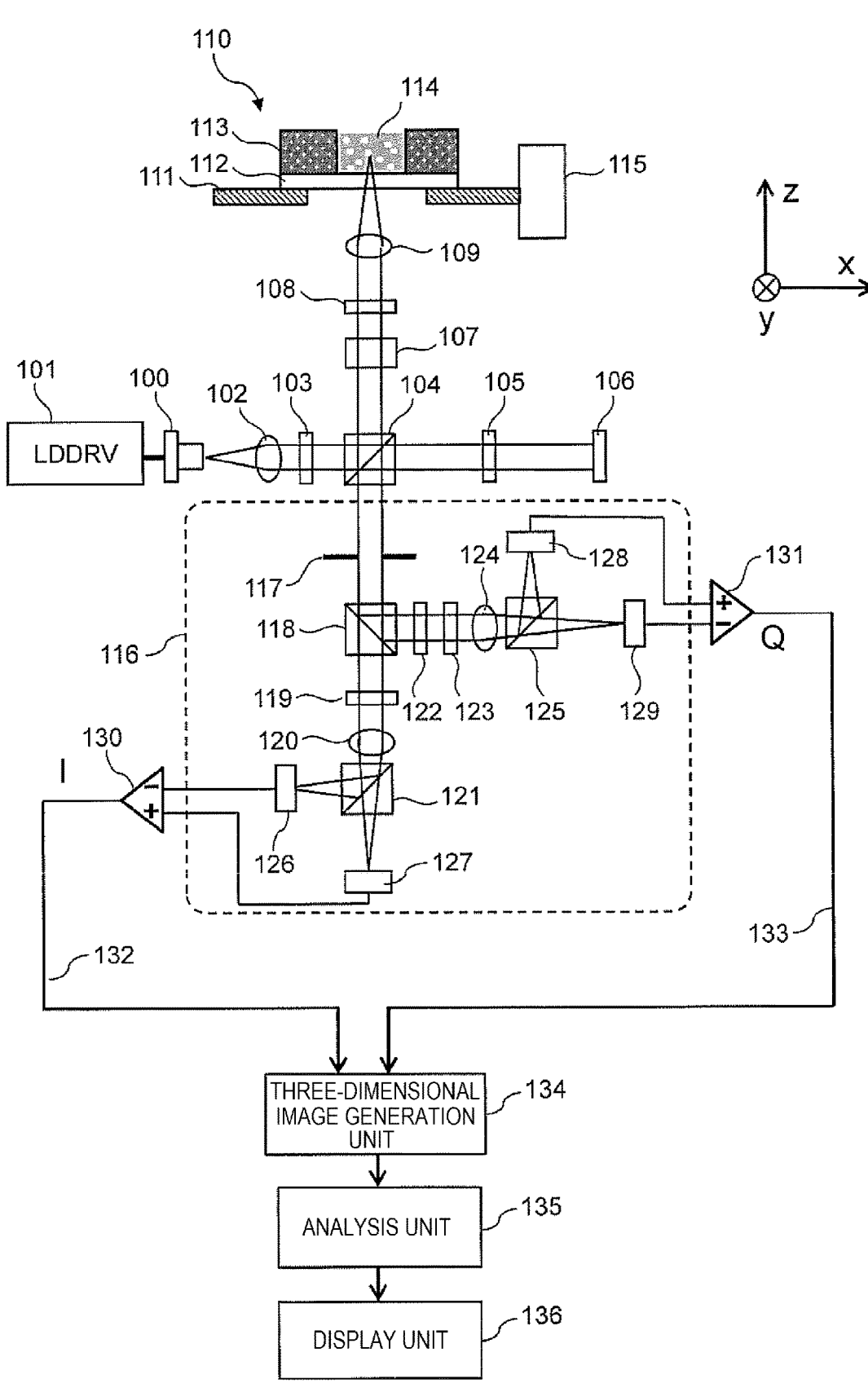
FIG. 1 shows an example of a configuration diagram of a particle measuring device according to Embodiment 1.

FIG. 1 shows an example of a configuration diagram of a particle measuring device according to Embodiment 1 of the invention. Light emitted from a light source 100 whose light emission state is controlled by a laser driver 101 is converted into parallel light by a collimating lens 102, a polarization direction of the parallel light is adjusted by a $\lambda/2$ plate 103 whose optical axis direction is adjustable, and then the polarized light is split into signal light (a reflected light component) and reference light (a transmitted light component) by a polarized beam splitter 104. A splitting ratio of the signal light and the reference light can be freely set by adjusting the optical axis direction of the $\lambda/2$ plate 103.

After polarized light of the reference light is converted into a circular polarized state by a $\lambda/4$ plate 105, the polarized light is reflected by a reference light mirror 106, reflected light is brought into a polarized state in which the polarized light is rotated by 90 degrees from an outward path by the $\lambda/4$ plate 105, and the polarized light is reflected by the polarized beam splitter 104. An optical axis direction of the signal light is deflected in the X and Y directions by a two-dimensional scanner 107, and then polarized light is converted into a circular polarized state by the action of a $\lambda/4$ plate 108, and the polarized light of the signal light is focused, by an objective lens 109, in a sample 114 stored in a sample container 110.

The two-dimensional scanner 107 plays a role of two-dimensionally scanning a focal position of the light focused by the objective lens 109 in an XY plane (in a plane perpendicular to the optical axis), and specifically, a combination of Galvano mirrors of a resonant type and a non-resonant type can be used as the two-dimensional scanner 107. A Z stage 115 that moves a sample in a Z axis direction (an optical axis direction) plays a role of scanning a focal position of the signal light on the sample 114 along the Z axis direction. The two-dimensional scanner 107 repeats a step of scanning a focal position of light on an XY plane perpendicular to an optical axis and the Z stage 115 repeats a step of moving a Z position of a focal point on the sample 114 at a predetermined interval $p_z$, so that the two-dimensional scanner 107 can scan a focal position of light in a specific three-dimensional region in the sample 114.

The signal light reflected from particles contained in the sample 114 is again converted into parallel light by the objective lens 109, the parallel light is brought into a polarized state in which polarized light is rotated by 90 degrees from an outward path by the action of the $\lambda/4$ plate 108, an optical axis direction is deflected to be in the same direction as the outward path by the two-dimensional scanner 107, and then deflected light is transmitted through the polarized beam splitter 104. The sample container 110 includes a transparent window 112 that transmits the signal light, a resin member 113 that forms a well, and a base plate 111 that is in contact with the transparent window 112, mechanically holds the sample container 110, and stabilizes a temperature of the sample 114.

The signal light and the reference light are combined by the polarized beam splitter 104 and guided to a detection optical system 116 as combined light. The combined light is split into transmitted light and reflected light by a half beam splitter 118 after a part of unnecessary light such as reflected light from the transparent window 112 is removed by a pinhole 117. The transmitted light of the combined light is transmitted through a $\lambda/2$ plate 119 whose optical axis is set to about 22.5 degrees relative to a horizontal direction, then the transmitted light is condensed by a condenser lens 120 and split into two beams by a polarized beam splitter 121, the split light beams are converted into electric signals by respective photodetectors 126 and 127, thereafter the electric signals are differentially amplified by a current differential amplifier 130 and are converted into a detection signal 132, and the detection signal 132 is input to a three-dimensional image generation unit 134. The reflected light of the combined light passes through a $\lambda/4$ plate 122 whose optical axis is set to about 0 degrees relative to the horizontal direction and a $\lambda/2$ plate 123 whose optical axis is set to about 0 degrees relative to the horizontal direction, and then the reflected light is condensed by a condenser lens 124 and is split into two beams by a polarized beam splitter 125, the split light beams are converted into electric signals by respective photodetectors 128 and 129, thereafter the electric signals are differentially amplified by a current differential amplifier 131 and are converted into a detection signal 133, and the detection signal 133 is input to the three-dimensional image generation unit 134. Optical axes of the $\lambda/2$ plates 119 and 123 can be adjusted, and accordingly, a splitting ratio of light split by the polarized beam splitters 121 and 125 can be adjusted.

When the detection signal 132 is denoted by I and the detection signal 133 is denoted by Q, the detection signal 132 and the detection signal 133 are expressed by the following formulas. $E_{sig}$ and $E_{ref}$ are respective electric field amplitudes of the signal light and the reference light, and $\theta$ is a phase difference between the signal light and the reference light. A constant such as photoelectric conversion efficiency of a photodetector is omitted for simplicity.

[Formula 1]

$$I = E_{sig}E_{ref}\cos\theta \tag{1}$$
$$Q = E_{sig}E_{ref}\sin\theta$$

A signal A proportional to an amplitude of the signal light can be obtained by performing a calculation of a square sum flat root on I and Q as follows.

[Formula 2]

$$A = \sqrt{I^2 + Q^2} = E_{sig}E_{ref} \tag{2}$$

The three-dimensional image generation unit 134 calculates the signal A expressed by Formula 2 for each focal position of light, and generates a three-dimensional image of the sample 114. An analysis unit 135 derives particle information by analyzing a plurality of generated three-dimensional images, and outputs the particle information to a display unit 136 to present the particle information to a user.

Embodiment 1: Size Measurement Principle Based on Reflected Light Amount

Figure 2:
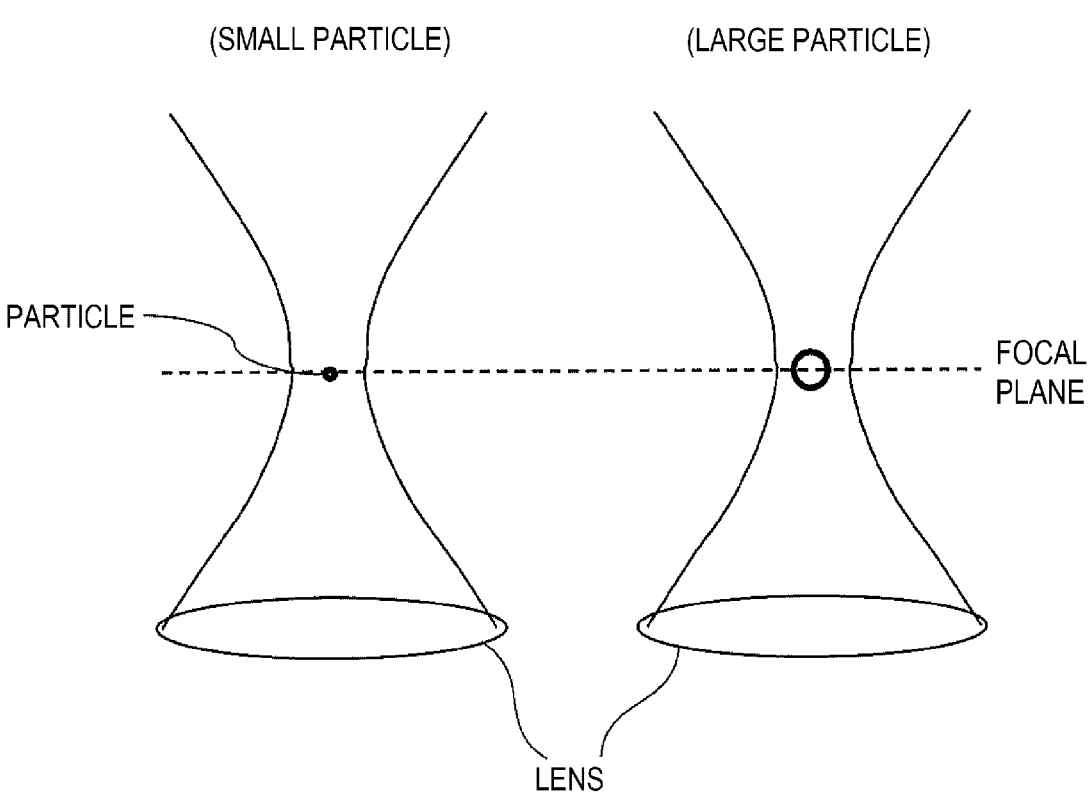
FIG. 2 is a diagram showing a relationship between a particle size and a reflected light amount when particles having a size smaller than a spot size are present at a focal position of light.

FIG. 2 is a diagram showing a relationship between a particle size and a reflected light amount when particles having a size smaller than a spot size are present at a focal position of light. A principle of particle size measurement performed by the particle measuring device according to the invention will be described with reference to FIG. 2. When the particle size is in a range smaller than the spot size, the larger a particle, the larger a ratio of a projected area of the particle in a light spot, and a reflected light amount increases. That is, an amount of reflected light from a relatively large particle shown on a right side of FIG. 2 is larger than an amount of reflected light from a relatively small particle shown on a left side of FIG. 2. Accordingly, a difference in particle sizes can be detected as a difference in reflected light amounts by analyzing a three-dimensional image and extracting a reflected light amount (a maximum value of a reflected light amount at a particle position) when particles are present at a focal point. A reflected signal amplitude A obtained from a particle present at a focal position is calculated by the following formula using a particle diameter d, a refractive index $n_{particle}$ of a particle, and a refractive index $n_{solvant}$ of a solvent. β is a constant determined by sensitivity of a detector, the spot size, and the like.

[Formula 3]

$$A = \beta \left| \frac{n_{particle} - n_{solvant}}{n_{particle} + n_{solvant}} \right| d \qquad (3)$$

A proportional coefficient β is clear by measuring a sample having a known size and refractive index such as polystyrene beads, and a particle diameter can be calculated by assigning a refractive index of particles and a refractive index of a solvent to Formula 3. The spot size of light can be adjusted by a wavelength and a numerical aperture of an objective lens, and can be set according to a size range of particles measured according to the present principle. For example, when a wavelength of a light source is 785 nm and a numerical aperture of an objective lens is 0.45, the spot size is about 1.74 μm. In this case, a particle having a particle diameter of 1.74 μm or less can be measured by the present principle. Regarding a particle having a size larger than the spot size, it is possible to calculate a particle size by the same approach as a microscopic method based on an obtained three-dimensional image.

Figure 3:
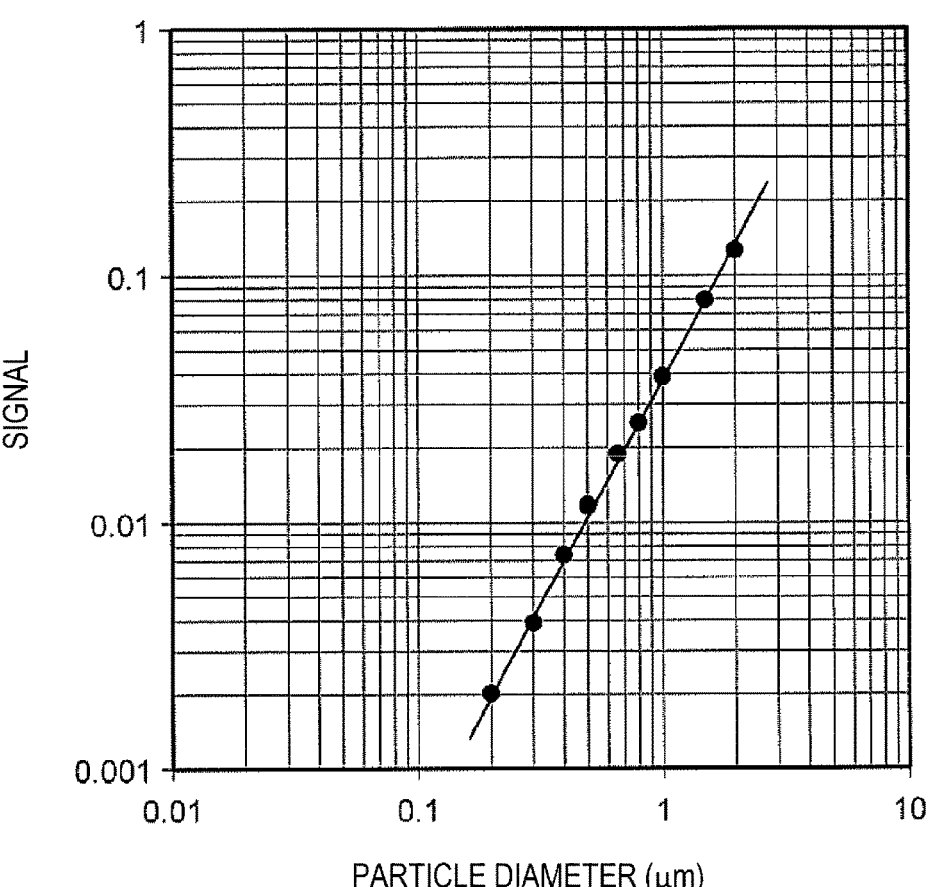
FIG. 3 shows a simulation result of a relationship between a particle diameter (a diameter of a particle) and a detection signal amplitude.

FIG. 3 shows a simulation result of a relationship between a particle diameter (a diameter of a particle) and a detection signal amplitude. In a simulation method, a "fluctuating light tracing method" disclosed in PTL 3 is used, a wavelength of a light source is set to 785 nm and a numerical aperture of an objective lens is set to 0.45. As shown in Formula 3, a detection signal amplitude is proportional to a particle diameter. By storing data of such a correspondence relationship in advance, a particle diameter can be calculated based on a magnitude of a detection signal using the particle measuring device according to the invention.

Figure 4:
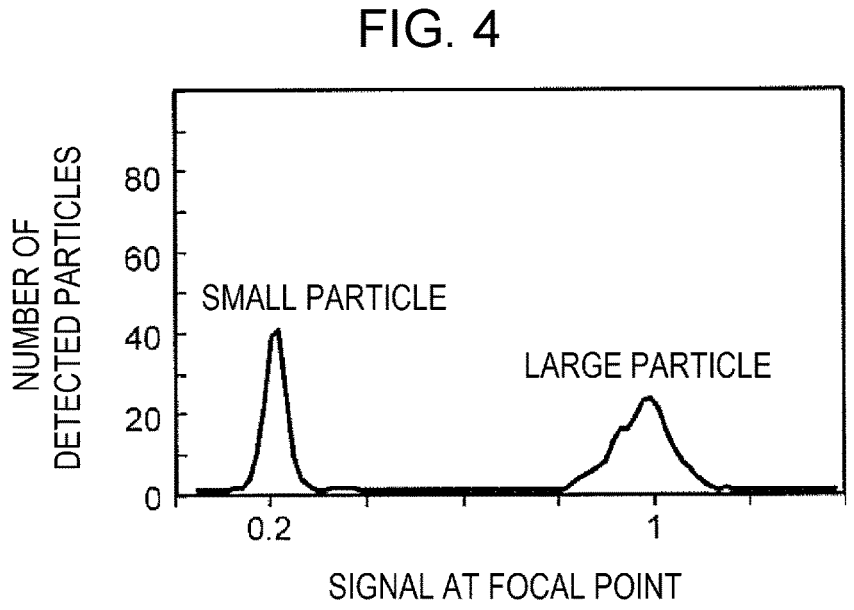
FIG. 4 shows a result of measuring a mixed sample of polystyrene beads having a diameter of 0.2 μm and polystyrene beads having a diameter of 1.0 μm using the particle measuring device according to the invention.

FIG. 4 shows a result of measuring a mixed sample of polystyrene beads having a diameter of 0.2 μm and polystyrene beads having a diameter of 1.0 μm using the particle measuring device according to the invention. It can be known that two kinds of particles having different sizes are detected separately based on a difference in reflected light amounts.

Embodiment 1: Sphericity Measurement

Next, a principle of measuring a sphericity of a particle in the particle measuring device according to the invention will be described. When particles to be measured are droplets of silicon oil or air bubbles, a shape of the particles is a true sphere (a perfect sphere), but when the particles are aggregates of protein, a shape of the particles is generally different from a sphere. Accordingly, a particle type can be determined by evaluating a sphericity of particles (how much a shape is close to a sphere).

Figure 5:
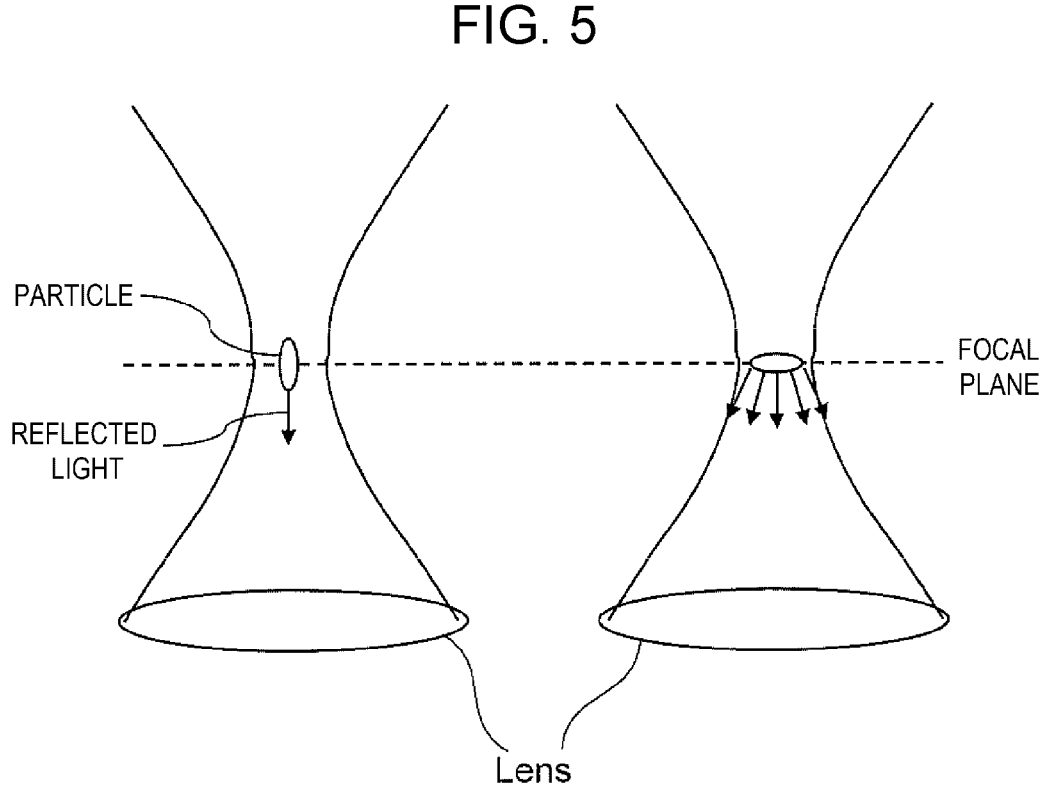
FIG. 5 is a schematic diagram showing a state of measuring particles that are not a true sphere.

FIG. 5 is a schematic diagram showing a state of measuring particles that are not a true sphere. As shown in FIG. 5, when a particle is not a true sphere, an amount of reflected light varies depending on a direction of the particle. Specifically, since a particle in a state shown on a right side of FIG. 5 has a larger ratio of a projected area of a particle in a light spot than a particle in a state shown on a left side of FIG. 5, an amount of reflected light from the particle in a state shown on the right side is large.

Since a direction of a particle constantly changes in a liquid, when an amount of reflected light from the same particle is repeatedly detected at different times, an amount of reflected light from a particle that is not a true sphere is not a constant value and has a certain degree of variation. That is, a difference in sphericity of particles can be detected as a difference in a magnitude of variation in reflected light amounts that are repeatedly acquired. In the invention, in order to repeatedly detect reflected light from the same particle, a focal position of light in a specific three-dimensional region is repeatedly scanned.

Figure 6:
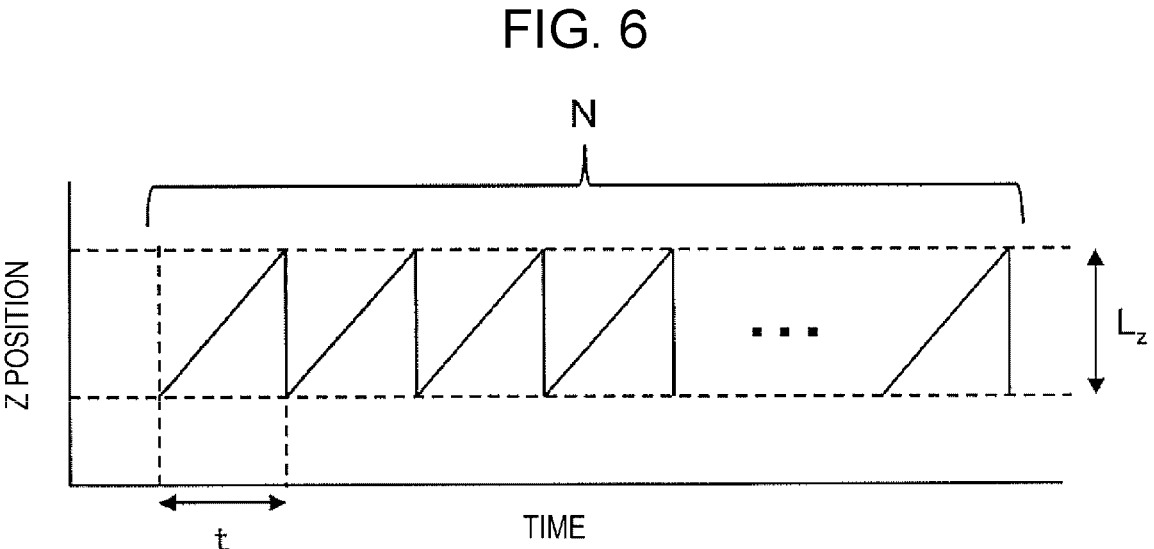
FIG. 6 is a diagram showing an operation of a Z stage 115 when scanning is repeatedly performed.

FIG. 6 is a diagram showing an operation of the Z stage 115 when scanning is repeatedly performed. Scanning is repeatedly performed N times in a region having a width $L_z$ in a Z direction at a time interval t (a time required to scan a specific three-dimensional region once).

Figure 7A:
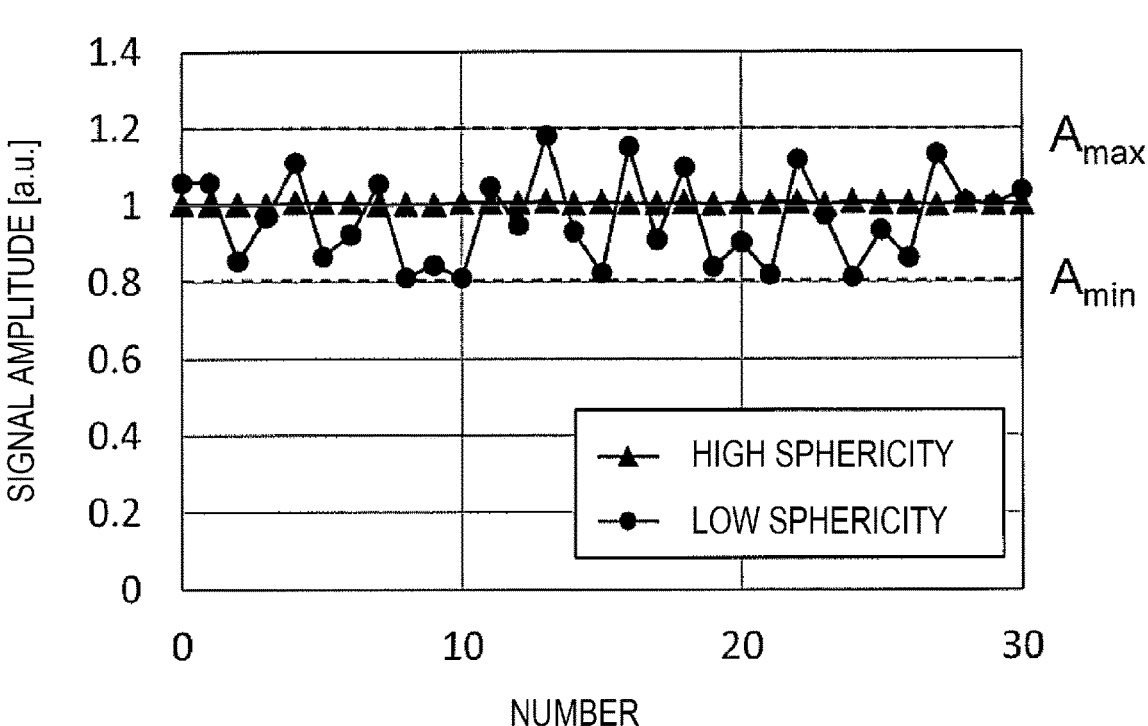
FIG. 7A is a schematic diagram showing a predicted result when the particle measuring device according to the invention repeatedly acquires reflected light from particles having a high sphericity and particles having a low sphericity.

FIG. 7A is a schematic diagram showing a predicted result when the particle measuring device according to the invention repeatedly acquires reflected light from particles having a high sphericity and particles having a low sphericity. It is predicted that a signal amplitude of the particles having a high sphericity is substantially constant, whereas a signal amplitude of the particles having low sphericity varies as shown in FIG. 7. In the invention, a parameter & representing a sphericity of a particle is defined by the following formula. $A_{min}$ and $A_{max}$ in the formula are respectively a minimum value and a maximum value of a reflected signal amplitude A from a particle that is repeatedly acquired.

[Formula 4]

$$\varepsilon = \frac{A_{min}}{A_{max}} \qquad (4)$$

ε corresponds to a ratio between a maximum value and a minimum value of a projected area of a particle in a light spot, and a particle is a true sphere when ε=1. A particle diameter of a particle that is not a true sphere can be defined using, for example, an average value $A_{ave}$ of a signal amplitude. A sphericity and a particle diameter of a particle larger than a spot size can be directly evaluated based on an image in the same manner as those in a microscopic method.

Figure 7B:
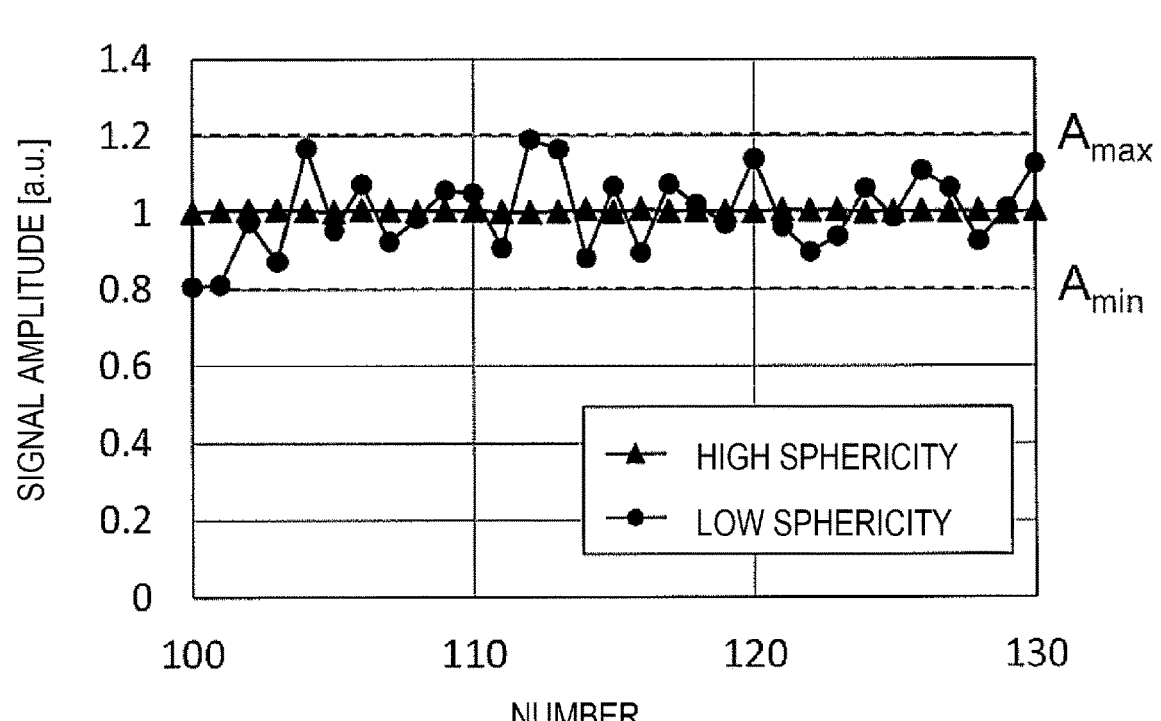
FIG. 7B is a schematic diagram showing a predicted result similar to that shown in FIG. 7A.

FIG. 7B is a schematic diagram showing a predicted result similar to that shown in FIG. 7A. In order to measure a sphericity with high accuracy, it is desirable to acquire a signal amplitude from a particle several tens of times or more. FIG. 7A shows an example in which an amplitude of a reflected signal from a particle is continuously acquired 31 times from 0th scanning to 30th scanning, but it is not necessary to continuously acquire the signal amplitude from first (0th) scanning to last scanning in this manner. For example, a total of 300 scanning may be performed, and a signal amplitude of particles present in a scanning range may be continuously acquired in 100th scanning to 131th scanning among the total of 300 scanning. FIG. 7B shows such an example.

Figure 8:
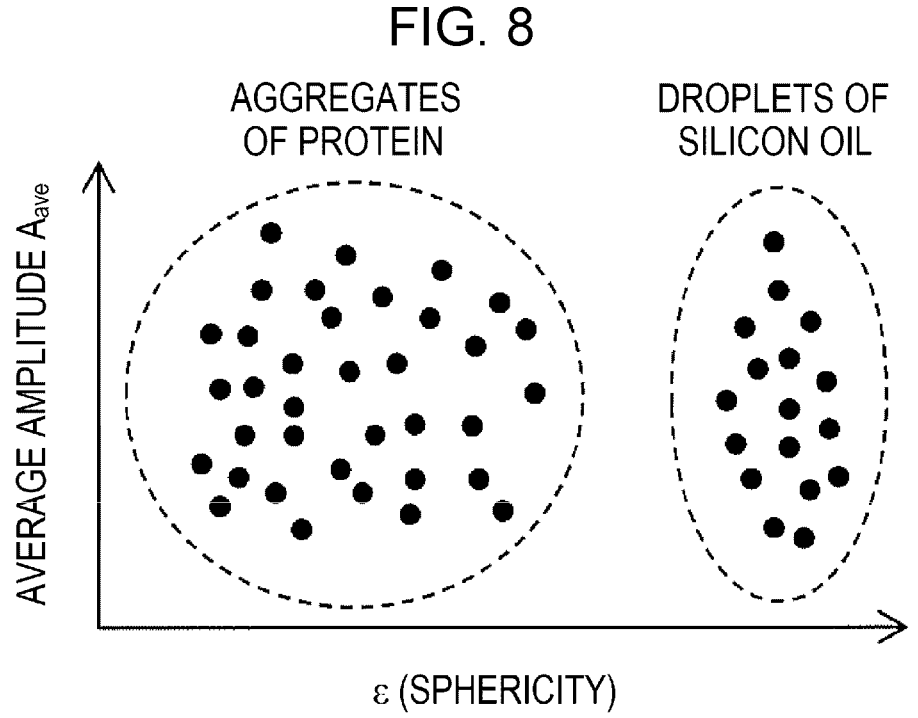
FIG. 8 shows an example of an expected result when the particle measuring device according to the invention measures a mixed sample of aggregates and liquid droplets of silicon oil and particles are plotted using an average signal amplitude $A_{ave}$ (or a particle diameter) and a sphericity parameter $\xi$.

FIG. 8 shows an example of an expected result when the particle measuring device according to the invention measures a mixed sample of aggregates and liquid droplets of silicon oil and particles are plotted using an average signal amplitude $A_{ave}$ (or a particle diameter) and a sphericity parameter ε. Aggregates of protein are distributed in a region having a low sphericity, and droplets of silicon oil are distributed in a region having a high sphericity, and thus particle diameters can be measured and the aggregates and droplets can be distinguished from each other at the same time.

Embodiment 1: Condition Required for Measuring Sphericity

Next, a condition required for acquiring reflected light from the same particle a plurality of times will be described. First, it is required to maintain identity of particles between m-th scanning and the (m+1)-th scanning (m is a natural number equal to or less than N). Here, the identity of particles refers to a state in which it can be confirmed that particles detected in the m-th scanning are the same as particles detected in the (m+1)-th scanning. Particles in a liquid perform a Brownian motion, and a typical particle movement amount Δr caused by the Brownian motion at a time interval t is calculated according to the following formula in which D is a diffusion constant of the particles. α is a constant of one or more.

[Formula 5]

$$\Delta r = \alpha\sqrt{6Dt} \tag{5}$$

A movement amount of particles in the Brownian motion follows a Gaussian distribution, and for example, the movement amount of particles is Δr or less with a probability of about 68% when α=1 and about 95% when α=2. The diffusion constant D of particles is expressed by the following formula using a Boltzmann constant $k_B$, an absolute temperature T of a solvent, a viscosity n of the solvent, and a particle diameter d.

[Formula 6]

$$D = \frac{k_B T}{3\pi\eta d} \tag{6}$$

For example, Δr is about 5.0 μm when α=2, t=5 seconds, d=0.2 μm, $k_B$=1.38×10$^{-23}$ J/K, T=25° C. (298.15 K), and η=0.00089 Pa*s. On the other hand, when a particle density is n, an average particle interval lave is calculated according to the following formula.

[Formula 7]

$$l_{ave} = n^{-1/3} \tag{7}$$

For example, $I_{ave}$ is about 46 μm when a particle concentration is 107 particle/mL. In order to maintain the identity of particles in the m-th scanning and the (m+1)-th scanning, the average particle interval needs to be larger than twice the movement amount of particles in the Brownian motion at the time interval t. This is expressed by the following formula. $D_{max}$ is a diffusion constant for a particle having a largest Brownian motion, that is, a smallest particle, in a particle diameter range to be measured.

[Formula 8]

$$n^{-1/3} > 2\alpha\sqrt{6D_{max}t} \tag{8}$$

Regarding a value of a, for example, identity is maintained for particles with a probability of about 68% or more when α=1, and about 95% or more when α=2. By solving Formula 8 for t, the following condition is obtained for a scanning time t per one time scanning of a three-dimensional region required to maintain identity of particles.

[Formula 9]

$$t < t_c \tag{9}$$

$$t_c = \frac{n^{-2/3}}{24\alpha^2 D_{max}}$$

Since the depends on a particle concentration and a particle size (via a diffusion constant), it is necessary to set the to an appropriate value according to a particle concentration range and a particle diameter range that are to be measured.

Figure 9:
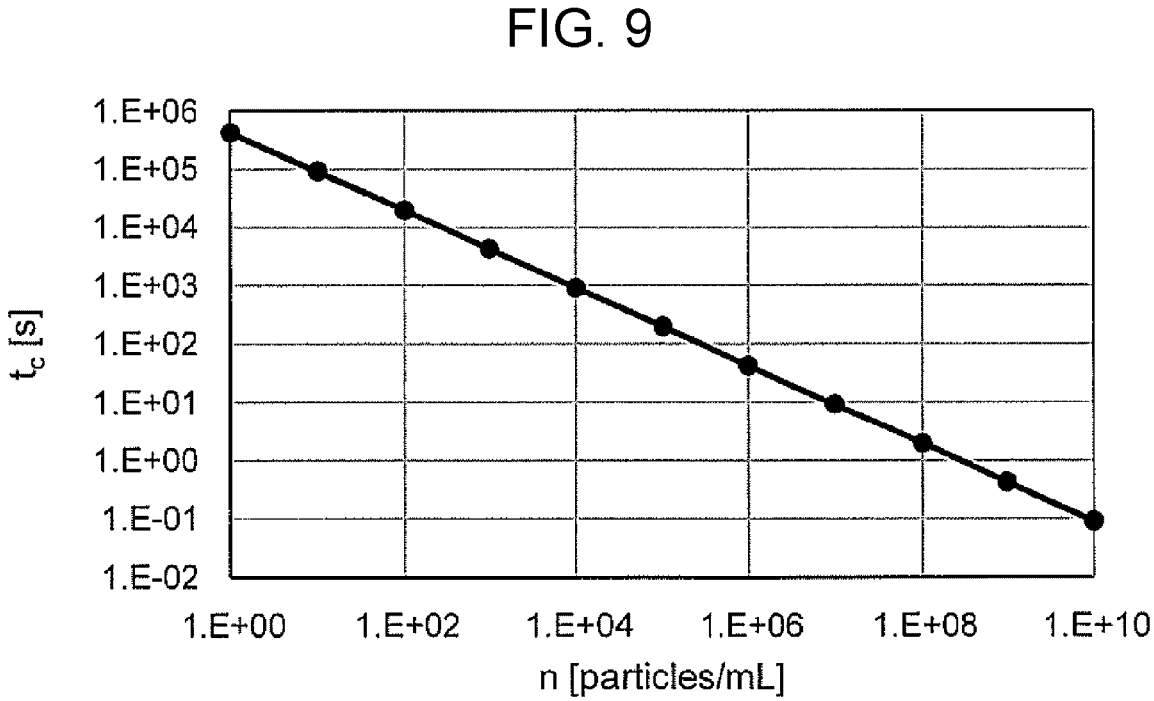
FIG. 9 shows dependence of the on a concentration.

FIG. 9 shows the dependence of $t_c$ on a concentration. Parameters used in a calculation include d=0.2 μm, T=25° C. (298.15 K), η=0.00089 Pa*s, and α=3. As a particle concentration increases, an average particle interval decreases, and thus the scanning time the required to maintain the identity of particles is reduced. For example, the is about 9.1 seconds when n=10$^7$ particle/mL. When it is difficult to satisfy Formula 9 because the concentration is high, a condition of Formula 9 can be satisfied by diluting the sample 114 at an appropriate ratio.

The scanning time t per one time scanning for a three-dimensional region can be expressed by the following formula in which Δt is a scanning time per one time scanning for an XY plane, and $p_z$ is a movement amount of a sample per one time movement in the Z direction moved by the Z stage 115.

[Formula 10]

$$t = \frac{L_z}{p_z}\Delta t \tag{10}$$

By assigning Formula 10 to Formula 9, the following condition to be satisfied by Δt, $L_z$, and $p_z$ required for maintaining the identity of particles is derived.

[Formula 11]

$$\Delta t < \frac{p_z}{L_z}t_c \tag{11}$$

In the invention, the identity of particles is maintained during N times of repeated scanning by setting $L_z$, $p_z$, and Δt to satisfy Formula 11. Since a value of the decreases as a particle becomes smaller, it is required to satisfy Formula 11 for a particle having a smallest particle size (a smallest particle size desired to be measured by a user) among particles to be measured. For example, when $p_z$=1.0 μm, $L_z$=100 μm, n=10$^7$ particle/mL, d=0.2 μm, T=25° C. (298.15 K), η=0.00089 Pa*s, and α=2 (this parameter condition is referred to as a condition I because the parameter condition will be referred to later in relation to FIG. 12), $\Delta t < 0.09$ in Formula 11, and a scanning speed satisfying this condition is sufficiently achievable by a Galvano mirror.

Figure 10:
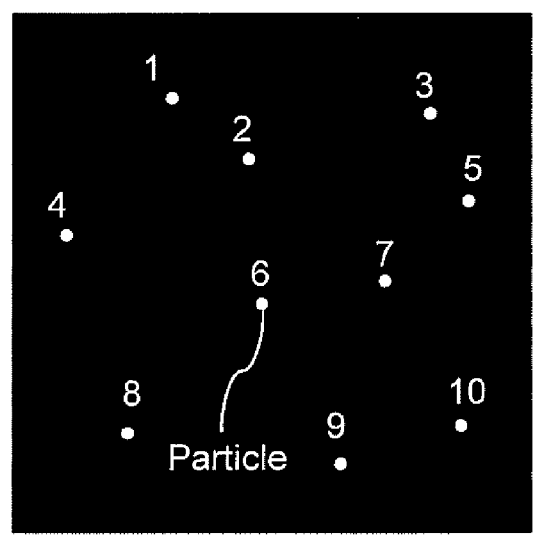
FIG. 10 is a schematic diagram showing XY images obtained in m-th scanning and (m+1)-th scanning at a certain z position.
Figure 10:
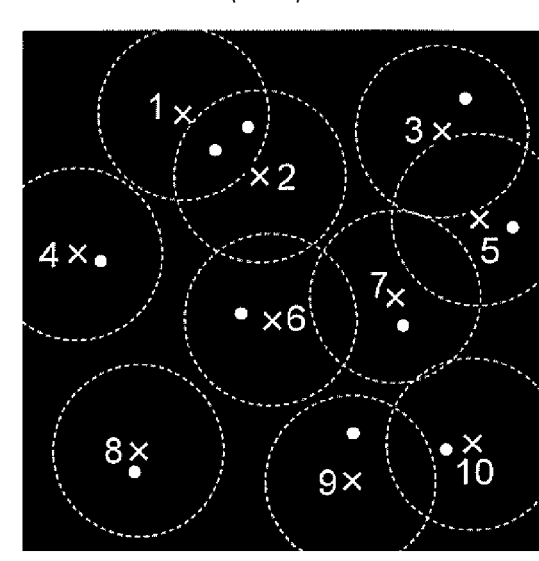
Figure 10:
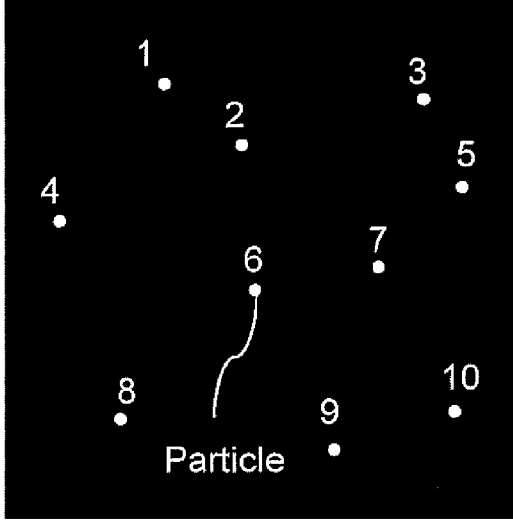
Figure 10:
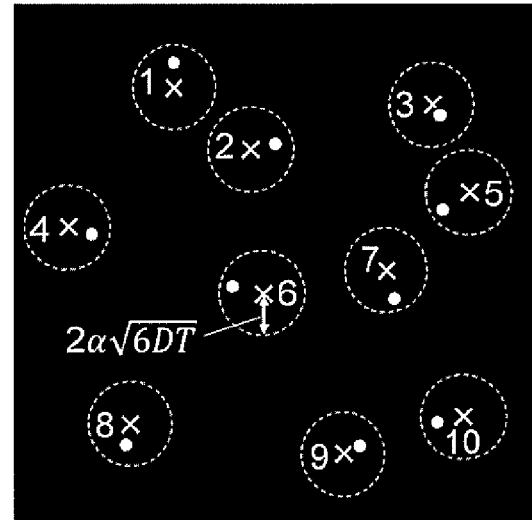

FIG. 10 is a schematic diagram showing XY images obtained in the m-th scanning and the (m+1)-th scanning at a certain z position. A cross mark in the drawing indicates a position of a particle in the m-th scanning, and a circle indicated by a dotted line indicates a circle having a radius $\Delta r$ around the cross mark. As shown in an upper part of FIG. 10, when the condition of Formula 11 is not satisfied, circles overlap with one another (a movement amount of a particle is larger than an average particle interval), and thus the identity of particles cannot be ensured. For example, since a first particle and a second particle in an image obtained in the (m+1)-th scanning are present in a region where circles overlap with one another, it is not possible to determine particles. On the other hand, as shown in a lower part of FIG. 10, when the condition of Formula 11 is satisfied, since circles do not overlap one another, it is possible to determine that a particle closest to a particle position detected in the m-th scanning is an original particle.

Figure 11:
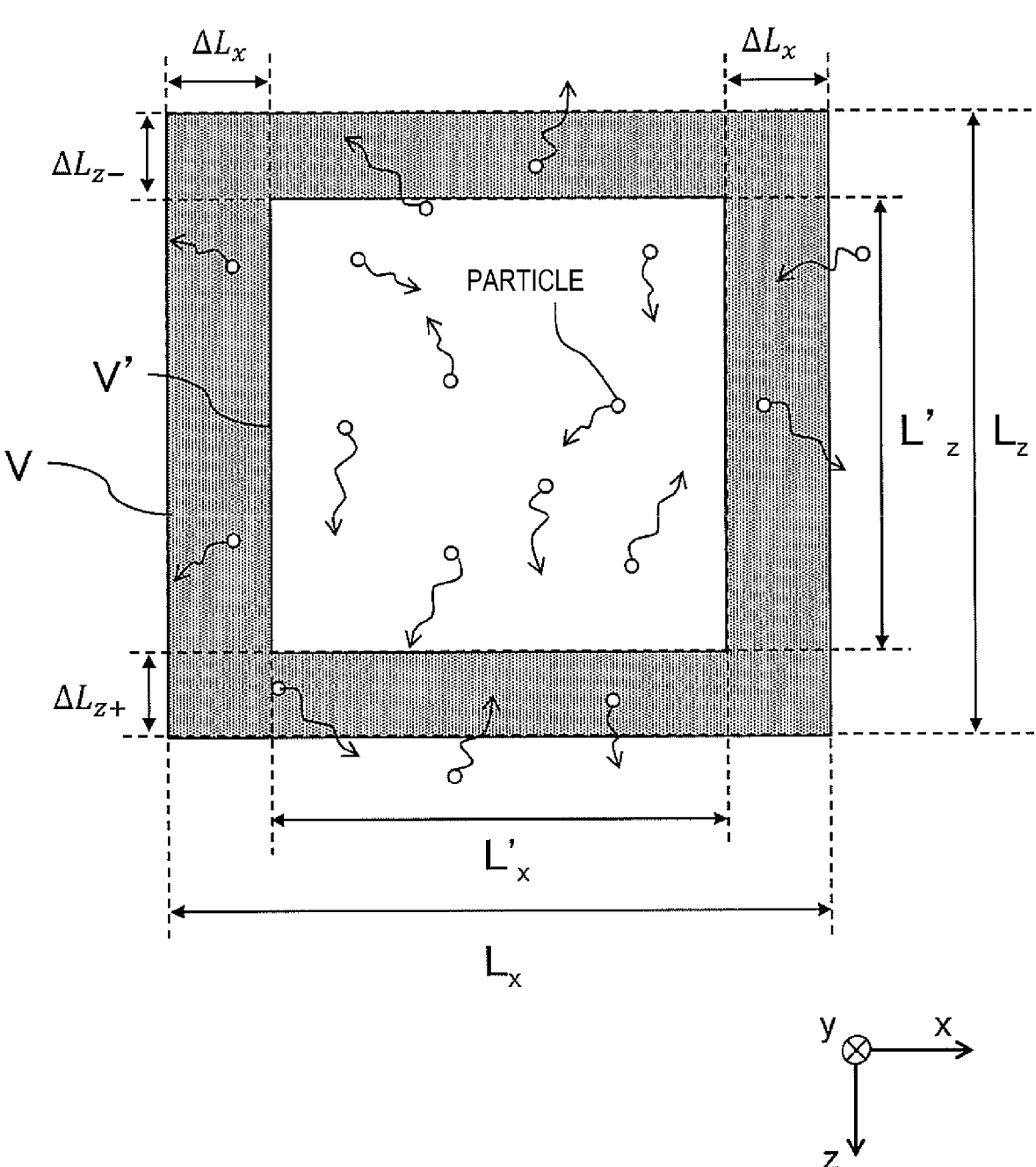
FIG. 11 is a schematic diagram showing a three-dimensional region in a sample.

FIG. 11 is a schematic diagram showing a three-dimensional region in a sample. Another condition for repeatedly acquiring N times reflected light from the same particle is that the particle does not move to the outside of a three-dimensional region to be scanned due to a Brownian motion or sedimentation during N times of scanning. As shown in FIG. 11, particles present in a peripheral portion of a scanning region V at the start of scanning may move to the outside of the scanning region V when scanning is repeated N times (an xz cross section is shown in FIG. 11). Widths of the scanning region in the x, y, and z directions are denoted by $L_x$, $L_y$, and $L_z$, the scanning region V is expressed by the following formula.

[Formula 12]

$$-\frac{L_x}{2} \le x \le \frac{L_x}{2}$$
$$-\frac{L_y}{2} \le y \le \frac{L_y}{2} \tag{12}$$
$$-\frac{L_z}{2} \le z \le \frac{L_z}{2}$$

In consideration of a Brownian motion and sedimentation of particles, a region V' (an inner region of the three-dimensional region V) in which particles from which reflected light can be repeatedly detected N times is considered. Assuming that convection is sufficiently prevented and movements of particles in the x and y directions are caused only by a Brownian motion, a largest movement amount in the x and y directions is a movement amount of a particle having a smallest size. Among particles to be measured, respective movement amounts $\Delta L_x$ and $\Delta L_y$ in the x direction and the y direction of a particle having a smallest size during a time Nt are expressed by the following formulas.

[Formula 13]

$$\Delta L_x = \alpha \sqrt{2D_{max}Nt} \tag{13}$$

-continued

[Formula 14]

$$\Delta L_y = \alpha \sqrt{2D_{max}Nt} \tag{14}$$

Therefore, in order to repeatedly detect the reflected light N times, a particle needs to be present in the following x and y regions, and the x and y regions are ranges in the x and y directions of the region V.

[Formula 15]

$$-\left(\frac{L_x}{2} - \Delta L_x\right) \le x \le \frac{L_x}{2} - \Delta L_x \tag{15}$$
$$-\left(\frac{L_y}{2} - \Delta L_y\right) \le y \le \frac{L_y}{2} - \Delta L_y$$

A particle movement in the z direction is caused by a Brownian motion and sedimentation, and a movement amount $\Delta Z$ of the particle in the z direction during the time Nt is expressed by a sum of two items as follows.

[Formula 16]

$$\Delta Z = \alpha \sqrt{2DNt} + |v|Nt \tag{16}$$

Assuming that a gravity direction is a z axis positive direction and a sedimentation velocity can be any of a positive value and a negative value depending on a density magnitude relationship between a solvent and a particle, maximum particle movement amounts $\Delta L_{z+}$ and $\Delta L_{z-}$ in a z positive direction and a z negative direction are expressed by the following formulas.

[Formula 17]

$$\Delta L_{z+} = \max_{d,v>0}\left\{ \alpha\sqrt{2DNt} + |v|Nt \right\} \tag{17}$$

[Formula 18]

$$\Delta L_{z-} = \max_{d,v<0}\left\{ \alpha\sqrt{2DNt} + |v|Nt \right\} \tag{18}$$

Here, for example, a right side of Formula 17 refers to that a value in parentheses is maximized relative to a particle diameter in relation to a particle having a positive sedimentation velocity. In order to repeatedly acquire reflected light N times from particles in a target particle diameter range, the particles need to present in the following z region, and the z region is a range in the z direction of the region V'.

[Formula 19]

$$-\left(\frac{L_z}{2} - \Delta L_{z-}\right) \le z \le \frac{L_z}{2} - \Delta L_{z+} \tag{19}$$

From Formula 15 and Formula 19, the following conditions need to be satisfied in order to set a volume of the region V' to be 0 or more.

[Formula 20]

$$L_x \ge 2\Delta L_x \tag{20}$$

-continued

[Formula 21]

$$L_y \geq 2\Delta L_y \tag{21}$$

[Formula 22]

$$L_z \geq \Delta L_{z+} + \Delta L_{z-} \tag{22}$$

For example, when $\alpha=2$, $N=10$, $t=5$ seconds, $d=0.2$ μm, $k_B=1.38\times10^{-23}$ J/K, $T=25°$ C. (298.15 K), and $\eta=0.00089$ Pa*s, $L_x$ and $L_y>62.7$ μm in Formula 20 and Formula 21, which is a condition that can be sufficiently achieved by a combination of a general Galvano scanner and an objective lens.

Next, specific values of $\Delta L_{z+}$ and $\Delta L_{z-}$ will be described. A sedimentation velocity v of a particle is calculated according to the following formula. d is a particle diameter, $\rho_{particle}$ is a density of particles, c is a resistance coefficient of particles, $p_{solvent}$ is a density of a solvent, and g is a gravitational acceleration.

[Formula 23]

$$v = \sqrt{\frac{4(\rho_{particle} - \rho_{solvant})gd}{3\rho_{solvant}\,c}} \tag{23}$$

When particles gently settle, that is, when an inertia is very small relative to a viscosity, the resistance coefficient c of the particles is calculated according to the following formula with the Reynolds number being denoted by R.

[Formula 24]

$$c = \frac{R}{24} \tag{24}$$

The Reynolds number R is expressed by the following formula.

[Formula 25]

$$R = \frac{vd}{18\eta} \tag{25}$$

When Formula 24 and Formula 25 are assigned to Formula 23 and are rearranged, the following Formula is obtained.

[Formula 26]

$$v = \frac{(\rho_{particle} - \rho_{solvent})g}{18\eta}d^2 \tag{26}$$

Figures 12, 13:
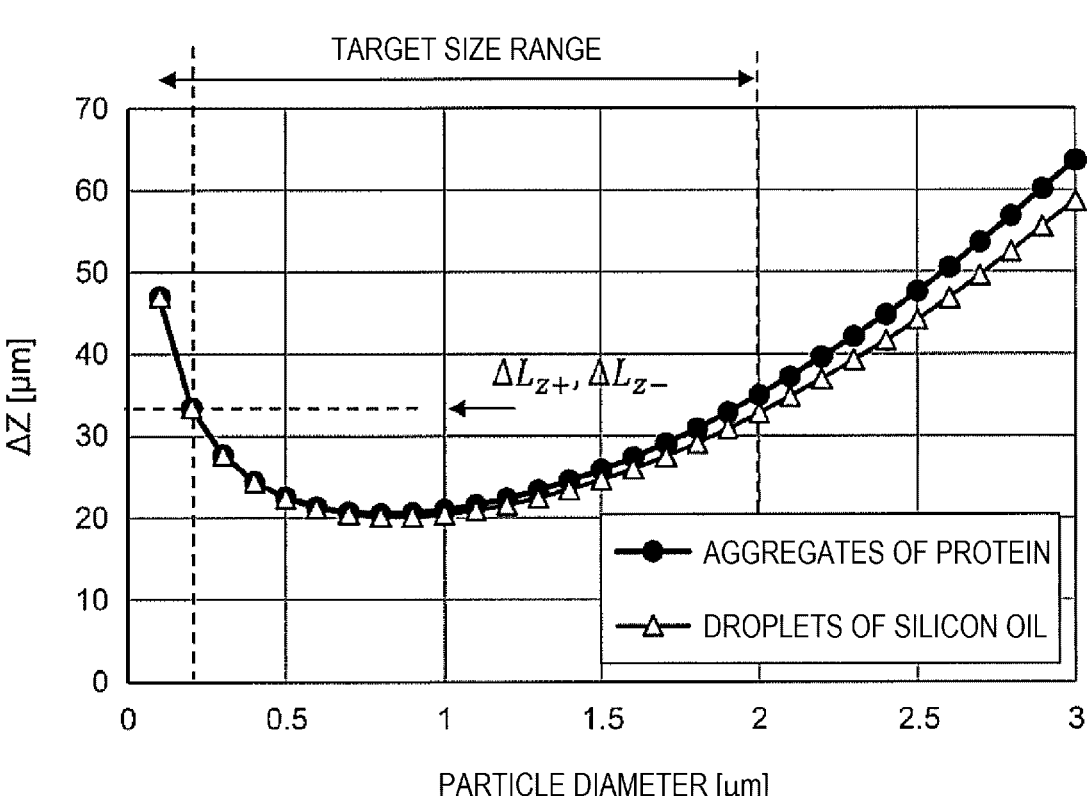
FIG. 12 shows dependence of AZ on a particle diameter d for an aggregate (having a positive sedimentation velocity) and silicon oil (having a negative sedimentation velocity).
FIG. 13 shows an example of an expected result when the particle measuring device according to the invention measures a mixed sample of aggregates of protein and air bubbles and particles are plotted using a signal amplitude A and a particle diameter de calculated based on a Brownian motion.

FIG. 12 shows the dependence of $\Delta Z$ on a particle diameter d for an aggregate (having a positive sedimentation velocity) and silicon oil (having a negative sedimentation velocity), which is calculated by assigning Formula 6 and Formula 26 to Formula 16. Parameters used in the calculation include $N=10$, $t=5$ seconds, $k_B=1.38\times10^{-23}$ J/K, $T=25°$ C. (298.15 K), $\eta=0.00089$ Pa*s, $g=9.8$ m/s², $p_{solvent}=1.0$ g/cm³, $\rho_{particle}$ is 1.2 g/cm³ for the aggregates, and $\rho_{particle}$ is 0.818 g/cm³ for the silicon oil. When a particle diameter is small (about 1.0 μm or less), the contribution of a Brownian motion is large, and when particles having a particle diameter of 1.0 μm or less are to be measured, an influence of sedimentation can be substantially ignored.

A range of the particle diameter d of particles to be measured is 0.2 μm to 2.0 μm. As described in Formula 16 to Formula 18, $\Delta L_{z+}$ and $\Delta L_{z-}$ are maximum values of $\Delta Z$ in a variable range of d. Accordingly, as shown in FIG. 12, a value of $\Delta Z$ when $d=0.2$ μm is $\Delta L_{z+}$ and $\Delta L_{z-}$ that are both about 31.6 μm. In this case, the condition of Formula 22 is $L_z>63.1$ μm, which is satisfied by the condition I that is an example of a condition satisfying the above-described Formula 11.

When particles to be measured are limited to small particles having a particle size of 1.0 μm or less and sedimentation of the particles is substantially negligible, the condition of Formula 22 can be simplified. When $v=0$ is assigned to Formula 17 and Formula 18, the following Formula is obtained.

[Formula 27]

$$\Delta L_z \equiv \Delta L_{z+} = \Delta L_{z-} = \alpha\sqrt{2D_{max}Nt} \tag{27}$$

When Formula 27 is assigned to Formula 22, the following Formula is obtained.

[Formula 28]

$$L_z \geq 2\alpha\sqrt{2D_{max}Nt} \tag{28}$$

Further, when Formula 10 is assigned to Formula 28 and rearranged, the following conditional Formula is obtained. This is the same as the condition of Formula 22 when sedimentation of particles can be ignored.

[Formula 29]

$$L_z > \frac{8\alpha^2 DN\Delta t}{p_z} \tag{29}$$

As described above, not only a particle diameter but also a sphericity of particles can be evaluated by repeatedly scanning a three-dimensional region so as to satisfy the conditions shown in Formula 11 and Formulas 20 to 22 and repeatedly detecting reflected light from the particles in Embodiment 1. Accordingly, a particle type can be determined.

Although a case where particles present in the peripheral portion of the scanning region V at the start of scanning are set as a measurement target is described in Embodiment 1, for example, particles that move to a measurement region from the outside of the measurement region during repeated scanning may be set as a measurement target. In this case, it is not necessary to satisfy Formulas 20 to 22. It is not necessary to use the number of repeated measurements N, the scanning region V, and the region V' defined at the start of scanning up to last scanning, and it is possible to redefine these parameters in the middle of scanning.

Embodiment 2: Evaluation of Brownian Motion

Coordinates of a particle constantly change due to a Brownian motion, and a movement amount of a particle caused by a Brownian motion varies depending on a particle diameter. In the particle measuring device according to the invention, it is possible to continuously observe coordinates of a particle for a certain period of time by repeatedly scanning a specific three-dimensional region. Here, in Embodiment 2 according to the invention, the diffusion constant of a particle expressed by Formula 6 is calculated based on a movement amount of the particle caused by a Brownian motion, and further a particle diameter is calculated based on a value of the diffusion constant. A configuration of the particle measuring device is the same as that in Embodiment 1. Since the signal amplitude A depends on a diameter and a refractive index of a particle and a Brownian motion depends only on a particle diameter as shown in Formula 6, the signal amplitude A and the Brownian motion provide different information on a particle.

Since a particle movement is caused not only by a Brownian motion but also by convection of a solvent due to non-uniformity of heat in the sample 114 or the like, prevention of occurrence of convection or prevention of influence of convection is important in ensuring stable measurement accuracy. In the invention, accumulation of heat in the sample 114 is prevented and convection is prevented by using the base plate 111 having a high heat dissipation property. Further, since a particle movement caused by convection of a solvent is substantially constant regardless of a particle diameter, an influence of convection is removed by subtracting an average movement amount of all particles when a movement amount of a particle is evaluated.

FIG. 13 shows an example of an expected result when the particle measuring device according to the invention measures a mixed sample of aggregates of protein and air bubbles and particles are plotted using a signal amplitude A and a particle diameter dB calculated based on a Brownian motion. Air bubbles have a larger refractive index difference from a solvent than aggregates, and air bubbles are distributed in a region having a larger signal amplitude than aggregates. Therefore, the aggregates and the air bubbles can be distinguished from each other. That is, a movement amount of a particle caused by a Brownian motion is evaluated in addition to a signal amplitude and a type of a particle can be determined by repeatedly scanning a three-dimensional region and continuously observing coordinates of a particle in the invention.

Embodiment 3: Evaluation of Sedimentation Velocity

Since particles in a liquid settle due to the action of gravity, and a position (Z coordinates) in a gravity direction changes over time. In Embodiment 3 according to the invention, the Z coordinates of a particle are continuously observed for a certain period of time by repeatedly scanning a specific three-dimensional region, and not only an amplitude of a reflected signal from a particle but also a sedimentation velocity of a particle expressed by Formula 23 or Formula 26 is evaluated. A configuration of the particle measuring device is the same as that in Embodiments 1 and 2.

Since a reflected signal amplitude A depends on a diameter and a refractive index of a particle, and a sedimentation velocity v depends on a diameter and a density of a particle, the reflected signal amplitude A and a progression speed v provide different information on a particle. For example, when d=1.0 μm, $\rho_{particle}$=1.2 g/cm$^3$, $\rho_{solvent}$=1.0 g/cm$^3$, g=9.8 m/s$^2$, and the sedimentation velocity is calculated using Formula 26, v=0.12 μm/s.

Figure 14:
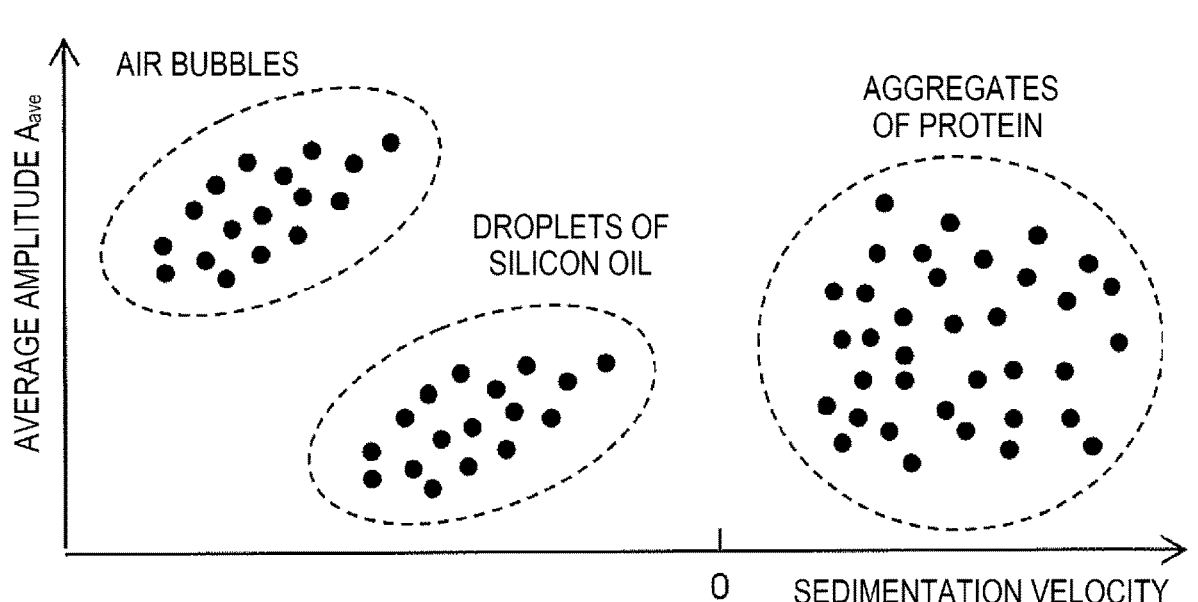
FIG. 14 shows an example of an expected result when the particle measuring device according to the invention measures a mixed sample of aggregates of protein, air bubbles, and droplets of silicon oil and particles are plotted using a signal amplitude A and a sedimentation velocity v.

FIG. 14 shows an example of an expected result when the particle measuring device according to the invention measures a mixed sample of aggregates of protein, air bubbles, and droplets of silicon oil and particles are plotted using the signal amplitude A and the sedimentation velocity v. Since the aggregates have a higher density than a general solvent, the aggregates have a positive sedimentation velocity, and since the air bubbles and the silicon oil have a lower density than a solvent, the air bubbles and the silicon oil have a negative sedimentation velocity. Since the air bubbles have a larger refractive index difference from the solvent and a smaller density than the silicon oil, the air bubbles are considered to be distributed in a region where a signal amplitude is larger and a sedimentation velocity is smaller (an absolute value is larger) than those of the silicon oil. As a result, three kinds of particles are separately detected as shown in FIG. 14.

In this manner, a movement amount of a particle caused by a sedimentation velocity is evaluated in addition to a signal amplitude and a type of a particle can be determined by repeatedly scanning a three-dimensional region and continuously observing coordinates of a particle in Embodiment 3. Not only the sedimentation velocity but also the sphericity described in Embodiment 1 and the particle diameter based on a Brownian motion described in Embodiment 2 are simultaneously calculated, so that a particle type can be determined with higher accuracy.

Embodiment 4: Apply Stirring and Heating Stress

Figure 15:
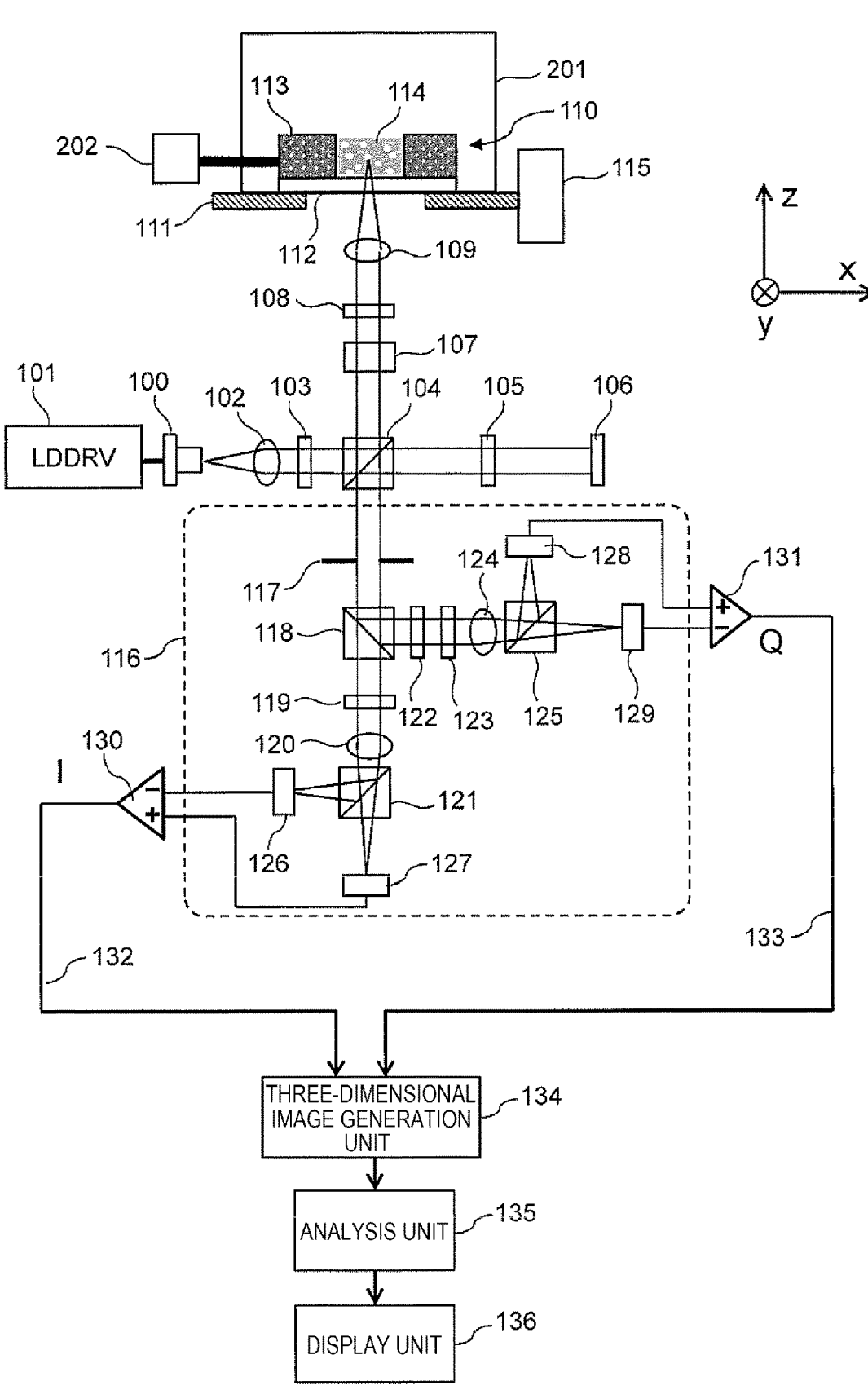
FIG. 15 is a schematic diagram showing a configuration example of a particle measuring device according to Embodiment 4.

FIG. 15 is a schematic diagram showing a configuration example of a particle measuring device according to Embodiment 4 of the invention. Embodiment 4 is different from Embodiments 1 to 3 in that Embodiment 4 further includes a constant temperature and humidity chamber 201 and a vibration stress applying unit 202. Other configurations are the same as those in Embodiments 1 to 3.

It is known that aggregates are generated by a physical stress such as heating and vibration, and in pharmaceutical research, stress tests are performed under various solvent conditions in order to search for a condition in which aggregates are less likely to be generated. In general, after a stress such as heating and vibration is applied to a sample using a stress tester, a measurement is performed using a particle measuring device. This process has a problem in that it takes time and effort to transfer a sample, a time lag occurs from application of a stress to a measurement, and a real-time measurement cannot be performed while applying a stress.

In Embodiment 4, a function of the stress tester is incorporated in the particle measuring device by providing the constant temperature and humidity chamber 201 for keeping a sample at a constant temperature and the vibration stress applying unit 202 for applying a vibration stress to the sample. In the present embodiment, it is possible to perform a measurement immediately after a stress is applied, without taking time and effort to transfer the sample during a stress test. Further, there is an advantage in that a real-time measurement can be performed while applying a heating stress.

<Modifications of Invention>

The invention is not limited to the embodiments described above and includes various modifications. For example, the embodiments described above have been described in detail to facilitate understanding of the invention, and the invention is not necessarily limited to those including all the configurations described above. Further, a part of a configuration according to a certain embodiment can be replaced with a configuration according to another embodiment, and a configuration according to another embodiment can be added to a configuration according to a certain embodiment. In addition, another configuration can be added to, deleted from, or replaced with a part of a configuration of each embodiment.

In the embodiments described above, the analysis unit 135 may calculate two or more parameters used for determining a particle type and output a calculation result in some formats, or may further use the parameters to determine a particle type and output a determination result. For example, on a plot plane shown in FIG. 8, FIG. 13, FIG. 14, or the like, plots can be classified into any particle type using a method such as clustering the plots or specifying a division line for dividing the plots.

In the embodiments described above, the three-dimensional image generation unit 134 and the analysis unit 135 may be implemented by hardware such as a circuit device in which functions of the three-dimensional image generation unit 134 and the analysis unit 135 are mounted, or may be implemented by an arithmetic unit such as a central processing unit (CPU) executing software in which the functions of the three-dimensional image generation unit 134 and the analysis unit 135 are mounted.

REFERENCE SIGNS LIST

100: light source
101: laser driver
109: objective lens
115: Z stage
116: detection optical system
134: three-dimensional image generation unit
135: analysis unit
136: display unit

The invention claimed is:

1. A particle measuring device for measuring a particle contained in a sample containing a solvent and the particle, the particle measuring device comprising:
a light source configured to emit light;
a condenser lens configured to condense the light and irradiate the sample with the light;
a two-dimensional scanner configured to repeatedly scan a focal position of the light in a three-dimensional region in the sample;
a photodetector configured to detect reflected light from the particle;
an image generation unit configured to generate a three-dimensional image of the sample based on a signal detected by the photodetector; and
an analysis unit configured to analyze the three-dimensional image, wherein
the analysis unit calculates two or more of
one or more parameters that are obtained based on a maximum intensity of the reflected light from the focal position during a process of repeatedly scanning the focal position along an optical axis direction of the light in the three-dimensional region, and that indicate a type of the particle, and
one or more parameters that are obtained based on a position of the particle acquired by continuously tracking the particle and that indicate a type of the particle, and outputs a calculation result;
wherein the analysis unit outputs, as the parameters, two or more of
the maximum intensity,
a sphericity of the particle calculated based on the maximum intensity obtained by causing the focal position to repeatedly reciprocate in the three-dimensional region along the optical axis direction,
a diffusion constant of the particle calculated based on a change in time in a position of the particle, or a size of the particle calculated based on the diffusion constant, and
a sedimentation velocity of the particle calculated based on a change in time in a position of the particle in a gravity direction.

2. The particle measuring device according to claim 1, wherein
the analysis unit calculates a size of the particle as the parameter according to a relationship among the maximum intensity, a refractive index of the particle, a refractive index of the solvent, and a size of the particle.

3. The particle measuring device according to claim 1, wherein
the two-dimensional scanner repeatedly causes the focal position to reciprocate along the optical axis direction in the three-dimensional region,
the analysis unit acquires, for each reciprocation, the maximum intensity obtained from the focal position in a process of causing the focal position to reciprocate, and
the analysis unit calculates, as the parameter, a numerical value representing a sphericity of the particle using a maximum value and a minimum value among maximum intensities in all repeated reciprocations.

4. The particle measuring device according to claim 1, wherein
when t is a time required for the two-dimensional scanner to scan the three-dimensional region once, n is a concentration of a maximum particle to be measured, D is a diffusion constant of a minimum particle to be measured, and a is a constant of one or more, $$t < \frac{n^{-2/3}}{24\alpha^2 D}$$

is satisfied.

5. The particle measuring device according to claim 1, wherein
the two-dimensional scanner repeatedly scans the focal position of the light in the three-dimensional region by repeating a step of scanning the focal position of the light in a two-dimensional plane perpendicular to the optical axis and a step of moving a position of the focal point of the light relative to the sample along the optical axis direction at an interval $p_z$, and
when $L_z$ is a width of the three-dimensional region along the optical axis direction, $\Delta t$ is a time required for the two-dimensional scanner to scan the two-dimensional plane once, n is a concentration of a maximum particle to be measured, D is a diffusion constant of a minimum particle to be measured, and a is a constant of one or more, $$\Delta t < \frac{n^{-2/3} p_z}{24\alpha^2 DL_z}$$

is satisfied.

6. The particle measuring device according to claim 1, wherein when $L_x$ and $L_y$ are respectively widths in vertical and horizontal directions of the three-dimensional region in a plane perpendicular to the optical axis, $L_z$ is a width in the optical axis direction of the three-dimensional region, t is a time required for the two-dimensional scanner to scan the three-dimensional region once, N is the number of times the two-dimensional scanner repeatedly scans the three-dimensional region, D is a diffusion constant of a minimum particle to be measured, $\alpha$ is a constant of one or more, $\rho_p$ is a density of the particle, $\rho_s$ is a density of the solvent, n is a viscosity of the solvent, g is a gravitational acceleration, and d is a diameter of the particle, $$L_x \geq 2\alpha\sqrt{2DNt}$$

$$L_y \geq 2\alpha\sqrt{2DNt}$$

$$L_z \geq \max_{d,\rho_p-\rho_s>0}\left\{\alpha\sqrt{2DNt}+\left|\frac{(\rho_p-\rho_s)g}{18\eta}d^2\right|Nt\right\}+$$

$$\max_{d,\rho_p-\rho_s<0}\left\{\alpha\sqrt{2DNt}+\left|\frac{(\rho_p-\rho_s)g}{18\eta}d^2\right|Nt\right\}$$

is satisfied.

7. The particle measuring device according to claim 1, wherein when $L_x$ and $L_y$ are respectively widths in vertical and horizontal directions of the three-dimensional region in a plane perpendicular to the optical axis, $L_z$ is a width in the optical axis direction of the three-dimensional region, t is a time required for the two-dimensional scanner to scan the three-dimensional region once, N is the number of times the scanning unit two-dimensional scanner repeatedly scans the three-dimensional region, D is a diffusion constant of a minimum particle to be measured, and a is a constant of one or more, $$L_x \geq 2\alpha\sqrt{2DNt}$$

$$L_y \geq 2\alpha\sqrt{2DNt}$$

$$L_z \geq 2\alpha\sqrt{2DNt}$$

is satisfied.

8. The particle measuring device according to claim 1, wherein the two-dimensional scanner repeatedly scans the focal position of the light in the three-dimensional region by repeating a step of scanning the focal position of the light in a two-dimensional plane perpendicular to the optical axis and a step of moving a position of a focal point of the light relative to the sample along the optical axis direction at an interval $p_z$, and when $L_x$ and $L_y$ are respectively widths in vertical and horizontal directions of the three-dimensional region in a plane perpendicular to the optical axis, $L_z$ is a width in the optical axis direction of the three-dimensional region, $\Delta t$ is a time required for the two-dimensional scanner to scan the two-dimensional plane once, N is the number of times the two-dimensional scanner repeatedly scans the three-dimensional region, D is a diffusion constant of a minimum particle to be measured, and a is a constant of one or more, $$L_x \geq 2\alpha\sqrt{2DNt}$$

$$L_y \geq 2\alpha\sqrt{2DNt}$$

$$L_z > \frac{8\alpha^2 DN\Delta t}{p_z}$$

is satisfied.

9. The particle measuring device according to claim 1, wherein the analysis unit calculates a diffusion coefficient of the particle as the parameter based on a change in time in a position of the particle.

10. The particle measuring device according to claim 9, wherein the analysis unit calculates a size of the particle as the parameter based on the diffusion coefficient of the particle.

11. The particle measuring device according to claim 1, wherein the analysis unit calculates a sedimentation velocity of the particle as the parameter based on a change in time in a position of the particle in a gravity direction.

12. The particle measuring device according to claim 11, wherein the analysis unit classifies a type of the particle by using a signal amplitude of the reflected light and the sedimentation velocity as the parameters.

13. The particle measuring device according to claim 1, further comprising:

a polarized beam splitter configured to split light emitted from the light source to generate signal light and reference light; and an interference optical system configured to combine the signal light reflected from the sample with the reference light to generate three or more beams of interference light having different phase relationships from one another, wherein the photodetector detects the interference light and outputs the interference light as an electric signal.

14. The particle measuring device according to claim 1, wherein the analysis unit determines a type of the particle using the two or more parameters and outputs a determination result.

*   *   *   *   *